United States Patent Office 2,988,484
Patented June 13, 1961

2,988,484
ALCOHOL SOLUBLE PHARMACEUTICAL COMPOSITIONS
George Barsky, New York, N.Y., and Vigen K. Babayan, Livingston, N.J., assignors to E. F. Drew & Co., Inc., New York, N.Y., a corporation of Delaware
No Drawing. Filed July 24, 1956, Ser. No. 599,703
4 Claims. (Cl. 167—82)

The present invention is directed to edible oils, more particularly synthetic products made from certain of the constituents of coconut type oil.

In Patents No. 2,238,442, issued April 15, 1941 in the name of Ernest F. Drew, there is described a reaction product of glycerine with certain of the lower fatty acids of coconut oil. Such products consisted of the mixed triglycerides of caprylic, capric and lauric acids in about equal proportions and containing also the glycerides of caproic and myristic acids in minor amount. Such a product has a number of desirable properties. However, for certain purposes the constituents do not give the desired properties, particularly for such uses as a base for various industrial applications as an ingredient in edible compositions.

In order to improve upon oils of this type, it is among the objects of the present invention to provide a triglyceride composition in which lower fatty acids of coconut oil are the sole acid ingredients and which shows a relatively high degree of solubility in alcohol.

It is also among the objects of the present invention to provide a composition of the type described, which is not only alcohol-soluble but quite stable, fluid below 0° C. and is adapted as a vehicle for various compositions such as flavorings, perfumes, medicinals, dyes and the like.

It is also among the objects of the present invention to provide a triglyceride which has unique and novel characteristics in nutritional uses where all the desirable protective effects and properties of the oil are maintained while body weight increase is retarded due to the use of this oil.

It is further among the objects of the present invention to provide a synthetic fatty material which is stable against oxidation, which is highly absorbable in the body, and which is readily digestible.

In practicing the present invention, there is provided a mixture of the fatty acids of coconut type oil, in which the principal acid is caprylic which constitutes from 65% to 95% of the acid mixture. The amount of caprylic acid is usually at least twice the amount of capric acid, which is normally present in the composition in amounts of about 5% to 35%. There may also be present minor amounts of caproic and lauric acids, the maximum amount thereof being about 5% of the mixture of the acids. Usually the caproic and lauric acids, if present, are in approximately equal amounts with the caproic being present in slightly greater amount than the lauric.

Any suitable process for making the products may be used. The acids are mixed with the glycerine under conditions such as have long been used in various esterification procedures. The mixture of esters, which are substantially neutral triglycerides, may have random distribution.

The products are stable against oxidation, are extremely light in color and even water-white. They have a bland, pleasant odor and flavor and are quite stable. When applied to the skin, they are non-irritating; they soften the skin and are absorbable thereby. They may be used as dispersing agents for oil-soluble organic substances.

The original coconut type oil is low in sterols and in the process of splitting the oil and fractionating the lower fatty acids, the sterol content is still further reduced so that commonly the products of the present invention have as little sterols as .001%. Therefore, when absorbed in the body tissues, there is substantially no danger of any deposit of sterol therefrom. Such products are readily assimilated, supplying energy and being largely oxidized. They may be used for edible purposes, such as for salad oil, either alone or blended with other oils. Since they have setting points from 0° to −15° C., they do not cloud up or set at refrigeration temperatures and lower.

The following are specific examples of the operation of the present invention.

Example 1

194 parts by weight of glycerine are mixed with 990.0 parts of fatty acids, constituting a 10% excess over that necessary to combine with the glycerine to form a triglyceride composition. The fatty acids are in the following proportions by weight:

| | |
|---|---|
| Caproic | 1.7 |
| Caprylic | 72.0 |
| Capric | 26.2 |

The mixture is agitated mechanically and a blanket of nitrogen is applied to the reaction vessel. Heat is applied and when the temperature reaches 140° C., water distills off and the temperature is gradually raised to a maximum of about 250° C. at the end of 11 hours. In the last 3 hours, a vacuum is applied to the extent of 6 to 10 mm. pressure.

The product is refined with sodium hydroxide solution in a manner well-known in the art. It is washed, dried, bleached and vacuum filtered. The free fatty acid value of the product is .06 calculated as oleic acid.

Example 2

A mixture is made of 0.6 mols. of glycerine and 2.1 mols. of fatty acids of the following composition by weight:

| | |
|---|---|
| Caproic | 0.8 |
| Caprylic | 68.9 |
| Capric | 29.3 |
| Lauric | 1.0 |

A small amount of zinc dust is introduced as a catalyst, agitation is applied and a blanket of nitrogen is provided on the reaction vessel. The reaction mass is heated over a period of 2½ hours from 145° C. to a maximum of about 245° C. at the end of the operation. Water vapor is removed as it is formed and towards the end of the operation, a vacuum is applied to the reaction vessel.

The product is alkali refined, washed, dried, bleached and filtered. It has a setting point of −6° C.

Example 3

A mixture is made of 194 parts of glycerine by weight with 990.0 parts of a fatty acid mixture of the following composition:

| | |
|---|---|
| Caprylic | 91.9 |
| Capric | 8.1 |
| Caproic | Trace |

Tin dust is added as a catalyst and the reaction vessel is heated up to a temperature of 260° C. over a period of about 8 hours. Water is removed in the vapor state as it is formed.

Generally the products described above have the following characteristics:

| | |
|---|---|
| Color (Lovibond) | 10 yellow, 1.0 red max. |
| Free fatty acid (as oleic) | 0.05%. |
| Iodine value | 5 max. |
| Sp. gr. at 120° F. | 0.9170. |
| Refractive index at 60° C. | 1.4352. |
| Setting point | Below −5° C. |
| Moisture | 0.1 max. |
| Kreis test (perox. rancid) | Negative. |
| Swift stability (oxid) | 150 hours plus. |
| Solubility | In 95% ethyl alcohol (infinite). |

The triglyceride may be prepared with or without the use of a catalyst. In many cases the resulting product has random distribution of the esters, but where certain conditions or catalysts are used, the product may not have random distribution; in such event, if the product is interesterified with the use of sodium methylate or the like as a promoter, random distribution is obtained. Generally the setting point will be lowered; for example, a product having a setting point of −6° C. before interesterification had a setting point of −12° C. after interesterification.

These products, as stated above, are suitable for various uses in various proportions, both for edible and nonedible purposes. The following are examples of uses to which the present products are eminently adapted.

*Example 4*

It may be used as an oil base in solution in various alcohols, usually the lower alcohols having from 1 to 6 carbon atoms. Such a composition is as follows:

| | Parts by volume |
|---|---|
| Product of Example 1 | 50 |
| Ethyl alcohol 95% | 50 |

*Example 5*

It has been found that the products are excellent vehicles for oil soluble vitamins. For instance, fish liver oils may be dissolved in such products in predetermined amounts, such as 1,000,000 units per gram. A typical composition is as follows:

| | Parts by volume |
|---|---|
| Product of Example 2 | 65 |
| Cod liver oil | 35 |

*Example 6*

The products may be used as body oils for application to the skin or they may be mixed with oils previously used for such purposes, as for example, in baby oils. Such a composition may be as follows:

| | Parts by volume |
|---|---|
| Product of Example 2 | 40 |
| Lubricating mineral oil | 60 |

Other constituents may be added thereto, such as perfume, or even coloring matter. Germicidal compounds which are soluble in oil may also be introduced into the composition.

*Example 7*

Various pharmaceutical, medicinal and cosmetic preparations may be made by using combinations of the above lower fatty acid glyceride oils with varying amounts of water, alcohols, emulsifiers, mineral oils and other vehicles. For instance, an antibiotic preparation may be suspended in the oil and a thickening agent, such as a metallic soap, for instance aluminum stearate, incorporated in the composition, and the mass stirred to render it homogeneous. Such thickening agents as glycerides of higher fatty acids, for example glycerol tripalmitate, may be used for the purpose.

A body oil is made by emulsifying the oil with water using a suitable emulsifier such as a polyglycerol ester of a fatty acid having 12 to 18 carbon atoms, or a monoglyceride of such a fatty acid.

The oil may be used as a carrier for an oil soluble vitamin or drug preparation. The solution may then be emulsified with a flavoring agent by the use of well-known emulsifying agents as above, to make the composition palatable.

*Example 8*

A facial or body cream containing lanolin and the present oil has the following composition by weight:

| | |
|---|---|
| Lanolin | 2.0 |
| Oil | 15.0 |
| Soap emulsifier | 5.0 |
| Mineral oil | 10.0 |
| Water | 67.8 |
| Perfume | 0.2 |

The present oils are more readily absorbable by the skin than the usual vegetable, animal and mineral oils so that the entire composition becomes readily absorbed by the skin and an increased effect is obtained.

*Example 9*

The present oils may be used as carriers or vehicles for dyes. For instance, the following is a typical composition:

| | Parts by weight |
|---|---|
| Oil | 70 |
| F.D. & C. Yellow #4 | 30 |

An excellent dispersion can be made having the following composition:

| | Parts by weight |
|---|---|
| Oil | 75 |
| Chlorophyllin | 25 |

This dispersion may be incorporated in a tooth paste, or dissolved in ethyl alcohol and added to a mouth wash.

*Example 10*

Various compositions of perfumes may be made by dissolving a perfume essential oil to the present oil which acts as a stable essential oil carrier, since the present oil is non-volatile at the temperatures of storage and use, being a solvent both for the essential oil and the alcohol contained in the perfume.

In similar manner, flavorings for foodstuffs and extracts of spices and the like are dissolved in the oil, which is a preferred carrier since it is stable to oxidation and has no tendency to become rancid even after long standing without refrigeration.

*Example 11*

The product of Example 2 was added to castor oil in various proportions, a suitable catalyst such as sodium methylate added, and the mixture interesterified in accordance with usual procedure. The products were washed, dried and steam deodorized to remove methyl esters formed in the reaction. They had the following characteristics:

| Interesterified | | Viscosity—Centistokes at— | | |
|---|---|---|---|---|
| Castor Oil | Present Oil | 210° F. | 100° C. | −20° F. |
| 100 | 0 | Jelled | | |
| 50 | 50 | 8.1 | 51.7 | Jelled. |
| 25 | 75 | 5.2 | 26.1 | Sl. Cryst. |

The viscosity of the castor oil before treatment was so high that it jelled even at the high temperature. After interesterification the viscosity had been greatly reduced so that its usefulness has been increased for various purposes, such as a lubricant which does not exhibit a tendency to gum formation or loss of lubricating values.

*Example 12*

As a dietetic food, the present oils have been found to be of substantial value. The oils may be added to foods in amounts up to 20–30% of the mixture, or the foods may be fried in said oils. They have been shown to be valuable in supplying energy without the tendency to deposit in the body, since they are readily oxidized.

Comparative tests were made on mice which were fed a normal diet with 20% of the present oils and a diet which contained 20% of lard. Substantially more of the present oils had to be ingested than of lard to maintain the body weight. When the mice were allowed to eat unlimited amounts of these foods, the increase in body weight was at a lower rate with the present oils.

The protective effect of the present oils against toxicity is excellent. In comparative tests, mice were fed with a normal diet containing 20% of the present oils and 10% of auto-oxidized cottonseed oil residues (known to have toxic effects), and also with a similar mixture using 20% of lard instead of the present oils. The mice fed with the present oils were able to eat more and gain more weight, with no toxic effects from the residues. The lard composition was not able to afford this protective effect.

The above examples are intended to illustrate the many applications of the invention. For instance, the product of Example 7 may be used for edible purposes, as a carrier for pharmaceuticals, a solvent, a lubricant, in bases for cosmetics such as cold cream, and others. The oils per se, or in physical admixture with other components such as gelling agents, thickening agents, emulsifiers, and the like, may be used in salad oils, mayonnaise, dressing spreads, and ointments.

This oil may be introduced in emulsion or alcohol solution form into the blood stream of patients requiring a rapid and concentrated source of energy without difficulty of utilizing the given energy, and with no undesirable side- or after-effects.

We claim:

1. A solution of a vitamin containing oil in an edible oil which is the triglyceride of a mixture of caprylic and capric acids in the ratio of at least 2 to 1, said mixture containing caproic and lauric acids in approximately equal proportions and constituting from 0% to 5% of the total acids.

2. A suspension of an antibiotic in an edible oil which is the triglyceride of a mixture of caprylic and capric acids in the ratio of at least 2 to 1, said mixture containing caproic and lauric acids in approximately equal proportions and constituting from 0% to 5% of the total acids.

3. A mutual solution of a mineral oil and an edible oil which is the triglyceride of a mixture of caprylic and capric acids in the ratio of at least 2 to 1, said mixture containing caproic and lauric acids in approximately equal proportions and constituting from 0% to 5% of the total acids.

4. A solution of an edible oil which is the triglyceride of a mixture of caprylic and capric acids in the ratio of at least 2 to 1, said mixture containing caproic and lauric acids in approximately equal proportions and constituting from 0% to 5% of the total acids in a monohydric alcohol having 1 to 6 carbon atoms and containing a vitamin soluble in oil.

References Cited in the file of this patent

UNITED STATES PATENTS

| Number | Name | Date |
|---|---|---|
| 1,995,240 | Blagden | Mar. 19, 1935 |
| 1,996,391 | Straus | Apr. 2, 1935 |
| 1,999,212 | Schulze | Apr. 30, 1935 |
| 2,022,464 | Hall | Nov. 26, 1935 |
| 2,037,563 | Curtis | Apr. 14, 1936 |
| 2,238,442 | Drew | Apr. 15, 1941 |
| 2,238,973 | Climenko | Apr. 22, 1941 |
| 2,298,122 | Hailer | Oct. 6, 1942 |
| 2,355,359 | Bainbridge | Aug. 8, 1944 |
| 2,368,578 | Sparhawk | Jan. 30, 1945 |
| 2,509,414 | Barsky | May 30, 1950 |
| 2,544,630 | Hegartz | Mar. 6, 1951 |
| 2,554,872 | Musher | May 29, 1951 |
| 2,615,160 | Baur | Oct. 21, 1952 |
| 2,764,605 | Embree | Sept. 25, 1956 |